(12) United States Patent
Shuey

(10) Patent No.: US 7,533,703 B2
(45) Date of Patent: May 19, 2009

(54) DETERMINING FUEL USAGE

(75) Inventor: Kenneth C. Shuey, Zebulon, NC (US)

(73) Assignee: Elster Electricity, LLC, Raleigh, NC (US)

( * ) Notice: Subject to any disclaimer, the term of this patent is extended or adjusted under 35 U.S.C. 154(b) by 372 days.

(21) Appl. No.: 11/205,803

(22) Filed: Aug. 17, 2005

(65) Prior Publication Data

US 2007/0039662 A1    Feb. 22, 2007

(51) Int. Cl.
    *B65B 1/30* (2006.01)
(52) U.S. Cl. .......................... 141/95; 141/94; 137/557; 222/71
(58) Field of Classification Search ............ 141/94, 141/95, 230; 137/557; 222/40, 71; 701/123
    See application file for complete search history.

(56) References Cited

U.S. PATENT DOCUMENTS

| | | | | | |
|---|---|---|---|---|---|
| 4,486,625 | A * | 12/1984 | Reinauer et al. | ....... | 379/106.01 |
| 5,708,424 | A | 1/1998 | Orlando et al. | ........ | 340/870.08 |
| 5,947,372 | A * | 9/1999 | Tiernan | ........................ | 236/94 |
| 6,023,667 | A | 2/2000 | Johnson | ...................... | 702/183 |
| 6,253,607 | B1 * | 7/2001 | Dau | .......................... | 73/290 R |
| 6,571,151 | B1 * | 5/2003 | Leatherman | ................. | 700/282 |
| 6,577,988 | B1 | 6/2003 | Travagline et al. | ........... | 702/188 |
| 6,580,950 | B1 * | 6/2003 | Johnson et al. | ............... | 700/17 |
| 6,684,245 | B1 * | 1/2004 | Shuey et al. | ................. | 709/223 |
| 6,691,025 | B2 * | 2/2004 | Reimer | ....................... | 701/123 |
| 6,822,565 | B2 | 11/2004 | Thomas et al. | ........... | 340/539.1 |
| 7,010,494 | B2 * | 3/2006 | Etzioni et al. | ................... | 705/1 |
| 7,127,361 | B1 * | 10/2006 | Batey et al. | .................... | 702/55 |
| 7,155,349 | B1 * | 12/2006 | Souluer | ........................ | 702/55 |
| 7,274,305 | B1 * | 9/2007 | Luttrell | .................. | 340/870.02 |
| 2004/0045623 | A1 * | 3/2004 | Parker et al. | .................... | 141/1 |
| 2004/0129075 | A1 | 7/2004 | Sorenson | ...................... | 73/313 |
| 2004/0236626 | A1 * | 11/2004 | Lynch | .......................... | 705/10 |
| 2004/0250850 | A1 * | 12/2004 | Murray et al. | ................ | 137/93 |
| 2006/0243345 | A1 * | 11/2006 | Lease | .......................... | 141/95 |

OTHER PUBLICATIONS

Cenex, Electronic Tank Monitoring, Cenex, Our Energy Comes Through, http://www.cenex.com/?Page=002264455& Path=0;0;2, 2 pages.
"Centeron: The World's No. 1 Wireless Tank Monitoring System", RobertShaw Industrial Products, http://wirelessmonitoring.centeron.net/index.html, 2004, 5 pages.
"Transreceiver Revolutionizes Meter Data Collection", Xemics, http://www.electronicstalk.com/new/xem/xem146.html, Dec. 28, 2004, 2 pages.
Woof, M., "Get in Touch", InfoMine News, World Mining Equipment, http://www.infomine.com/news/newsletters/websites/editorials/suppliers/00080.htm, 2 pages.

* cited by examiner

*Primary Examiner*—Timothy L Maust
*Assistant Examiner*—Jason K Niesz
(74) *Attorney, Agent, or Firm*—Woodcock Washburn LLP

(57) ABSTRACT

A system, device, and method for quantifying fuel flow from a substantially stationary consumer container is contemplated. The system includes a flow sensor, a communications medium, and a receiver. Both the flow sensor and the receiver are in communication with the communications medium. The system may include a display, a computing device in communication with the receiver and an environmental sensor in communication with the communications medium. The communications medium may be wireless.

29 Claims, 5 Drawing Sheets

DETERMINING FUEL USAGE

BACKGROUND

Many use home heating fuel that typically is stored in tanks on a customer's premises. The heating fuel may be propane, heating oil, or some other fuel designed for a furnace, fireplace, and/or water heater. The fuel container may be owned by an independent fuel provider or may be owned by the customer. The current way that a customer monitors his or her fuel usage is by periodically walking to the container to look at the container's fill gauge. The gauge usually only presents the fuel level in terms of a percentage of a full tank. This presents a number of problems.

First, it is difficult for customers to accurately monitor the level of fuel in the container. The manual process of checking the fuel level typically is not done on a regular basis, and for many customers it may be done so irregularly that the container may be close to empty between inspections. In many cases, especially when there is a sudden shift to colder weather, customers drastically increase their fuel usage and empty the fuel container. The customer is without fuel until an emergency refill is completed and running out of fuel may cause damage to the equipment using the fuel.

Also, it is problematic for a customer to monitor the rate of fuel usage over a short period of time accurately. The fuel tank may be 500 to 1000 gallons capacity, and it is difficult to determine the amount of fuel used during a short window of time because the tank gauge presents the fuel information in terms of a percentage of a full tank. This is such a coarse resolution that meaningful short term usage information typically is not available. As a result, there is not an accurate mechanism to measure and identify any particular characteristic that may adversely affect fuel use. For example, if the customer is using gas logs in a fireplace, it is difficult to make a determination of the effect the fireplace has on the overall fuel consumption.

In addition, it is difficult for customers to take advantage of variations in fuel price over time or among different providers. Typically, when the tank is owned by the fuel provider, the customer can only purchase fuel from that provider. If the customer owns the fuel tank, he or she can shop for fuel from different providers. When a customer determines that the percentage of fuel remaining in the tank is low, there may be no indication of the current price of replacement fuel. As a result, the customer typically orders a complete refill or a number of gallons of fuel, and the price paid is the current "spot" price of fuel. It should be appreciated that the purchase of a large container of heating fuel at a temporarily high price can be an extremely costly event.

SUMMARY

A system, device, and method for quantifying fuel flow from a substantially stationary consumer container is contemplated. The system includes a flow sensor, a communications medium, and a receiver. Both the flow sensor and the receiver are in communication with the communications medium. The system may include a display, a computing device in communication with the receiver and an environmental sensor in communication with the communications medium. The communications medium may be wireless.

The device for quantifying fuel flow from a substantially stationary consumer container includes a flow sensor, an input, and a transmitter. The input may present fuel flow to the flow sensor. The flow sensor may quantify the fuel flow into flow data. The transmitter may communicate the flow data. The device also may include a battery, an environmental sensor, and a fill gauge.

The method for quantifying fuel flow from a substantially stationary consumer container includes receiving flow, quantifying flow into flow data, and communicating the flow data. The method also may include displaying the flow data, estimating future flow data, determining an optimum price fuel ordering window, determining an emergency fuel ordering window, and ordering a fuel refill.

DETAILED DESCRIPTION

In the following description, for purposes of explanation and not limitation, specific details are set forth, such as particular networks, communication systems, computers, devices, components, techniques, data and network protocols, hardware, etc. in order to provide a thorough understanding. However, it will be apparent to one skilled in the art other embodiments that depart from these specific details are within the scope of the embodiments. Detailed descriptions of well-known networks, communication systems, computers, devices, components, techniques, data and network protocols, hardware are omitted so as not to obscure the description.

Figure 1:
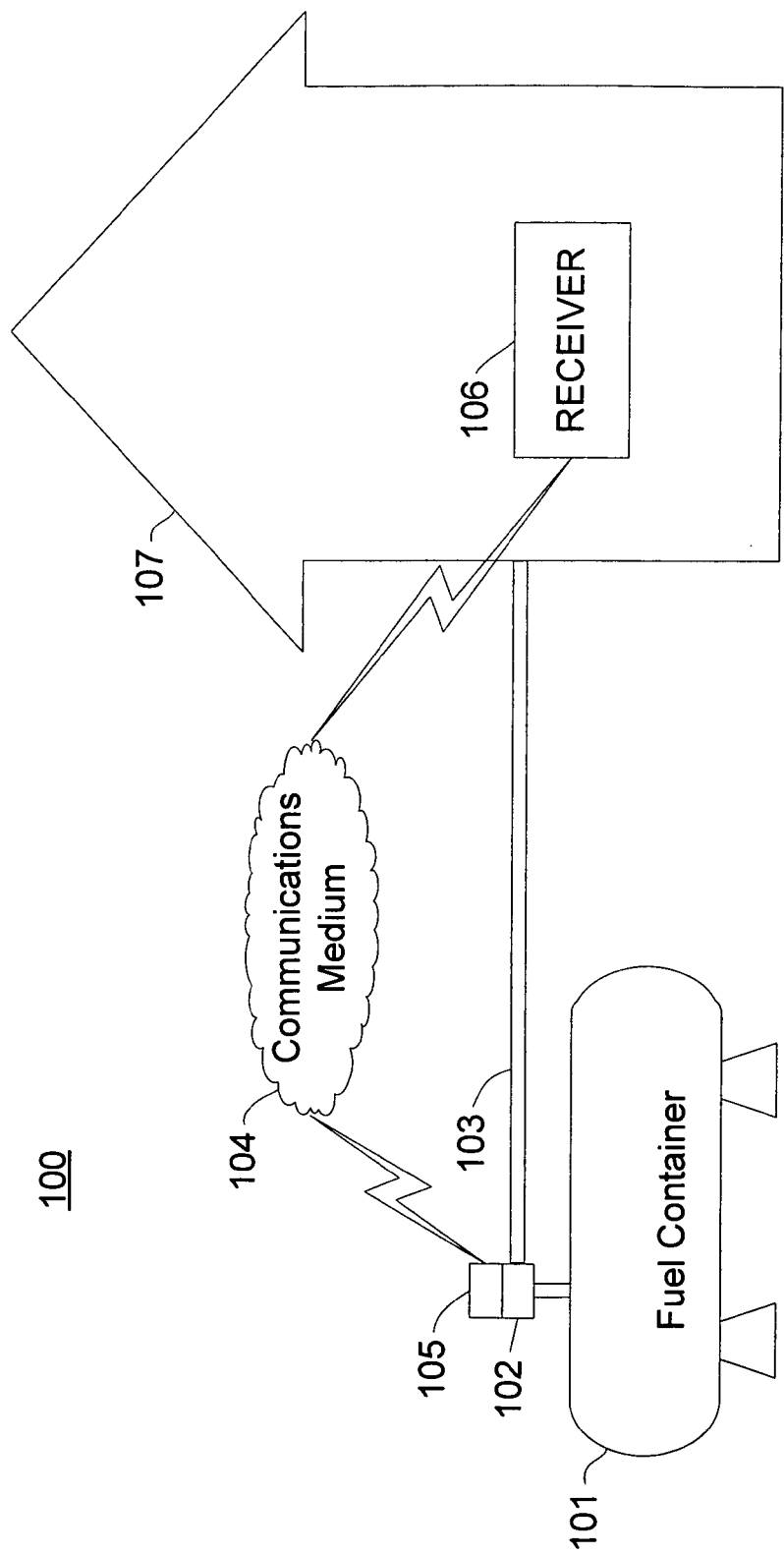
FIG. 1 is a block diagram of an exemplary system for quantifying fuel flow.

FIG. 1 is a block diagram of a system for quantifying fuel flow 100. A fuel container 101 may hold consumer heating fuel such as oil or propane, for example, for use in a residence, office, or other building 107. Fuel container 101 typically may be substantially stationary and may be attached to the ground near and outside of building 107. A fuel pipe 103 or other connection may connect fuel container 101 to building 107 to pass fuel from container 101 to building 107 for consumption by the building's heating system or for some other system and/or purpose.

A flow sensor 102 may be connected between fuel container 101 and fuel pipe 103. Flow sensor 102 may be connected to container 101 permanently or demountably, for example. Flow sensor 102 may be demountably attached so that it may be installed on fuel containers that do not have fuel sensor 102 as well as be removed when fuel container 101 is replaced. Flow sensor 102 may quantify the fuel flow. The fuel flow may include the rate at which the fuel passes a point. This rate may be a measure of fuel volume or mass divided by a time unit. The fuel flow may be quantified in gallons per day, for example. The resultant quantified value of fuel flow is flow data.

Flow sensor 102 may communicate the flow data and/or other data via a communications medium 104. Communications medium 104 may be any communications system suitable for transmitting and receiving data. Communications medium 104 may be wired such as twisted pair wire, Category 5 Ethernet cable, or fiber optic cable, for example. Communications medium 104 may be wireless such as infrared or any RF communications protocol including Bluetooth, IEEE 802.11 WiFi, IEEE 802.16 WiMax, or Global System for Mobile Communications (GSM), for example. Communications medium 104 may operate as unidirectional or bidirectional, and it may connect a transmitter 105 and a receiver 106. Receiver 106 may enable reception of the data from flow sensor 102. Transmitter 105 and receiver 106 may be operable with the communications medium.

In one example, communications medium 104 may employ transmitter 105 that uses a radio frequency within the 218-219 MHz spectrum or other spectrum. The modulation technique may be phase-shift keying, frequency-shift keying, on-off keying, or quadrature amplitude, for example. The power output may be appropriate for the nature and distance of the space between transmitter 105 and receiver 106.

In another example, communications medium 104 may employ transmitter 105 that is standard ISM (Industrial, Scientific, and Medical) waveband spread spectrum with a power output capable of reaching building 107. This radio transmit power may be in the range of +15 to +30 dBm to satisfactorily communicate with receiver 106.

Figure 2:
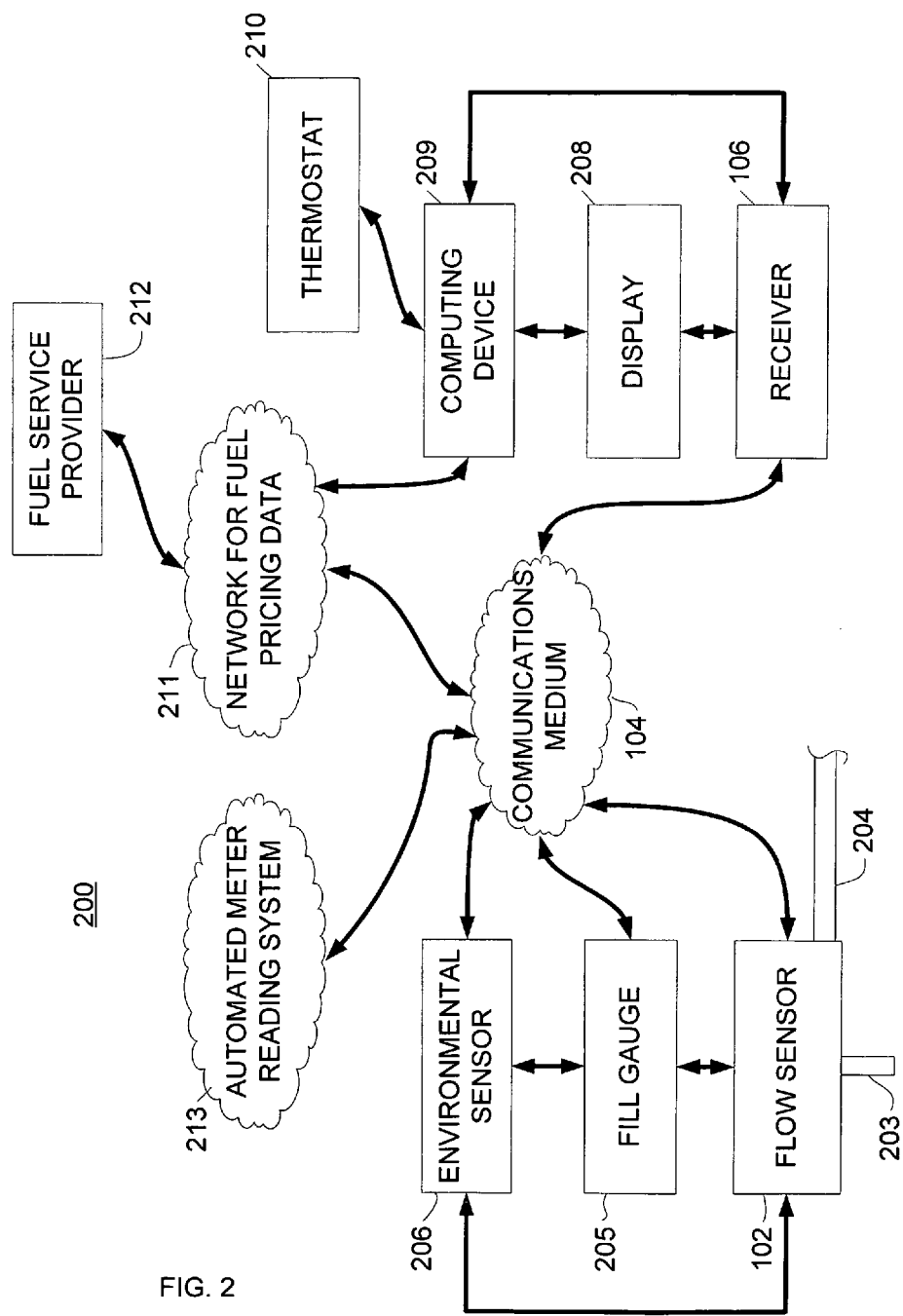
FIG. 2 is a block diagram of an exemplary system for quantifying fuel flow.

FIG. 2 provides another example, system 200, for quantifying fuel flow. System 200 may include communications medium 104, flow sensor 102, receiver 106, an input 203, a fuel output 204, a fill gauge 205, any number of environmental sensors 206, a display 208, a computing device 209, a thermostat 210, a network for fuel pricing data 211, an automated meter reading system 213, and a fuel service provider 212, for example.

Fill gauge 205 measures the overall level of fuel in container 101. This overall fuel level may be quantified as a unit mass or volume of fuel, gallons for example. Fill gauge 205 may be in communication directly with communications medium 104 or indirectly through flow sensor 102 or other components not discussed here for brevity and clarity. The data generated by fill gauge 205 may be available at receiver 106.

Environmental sensor 206 may measure any number of environmental characteristics, such as temperature, wind speed, humidity, or atmospheric pressure, for example. These characteristics may help determine the rate of fuel consumption and may be relevant indicators for predicting fuel usage and efficiency. For example, there may be a correlation between environmental temperature and fuel usage. Consumers using residential heating fuel may burn more fuel when the temperature is low and less fuel or none at all when the temperature is high, for example. There may be an additional correlation between fuel usage and wind speed and pressure, for example. Under high winds and low pressure, building 107 may be less efficient at retaining heat than under still winds and high pressure, and as a result, the fuel usage may be greater during the former as compared to the latter.

In addition, environmental sensor 206 may detect fuel leaks by sensing the presence of fuel outside of the tank. Environmental sensor 206 may be directly in communication with communications medium 104 or indirectly though another device such as fill gauge 205 or flow sensor 102, for example, or other components not discussed here for brevity and clarity. The data of environmental sensor 206 may be available at receiver 106.

Receiver 106 may be in communication with communications medium 104 for receiving data generated by flow sensor 102, fill gauge 205, environmental sensor 206, and other data sources that may be available. The receiver may receive data periodically from the data sources or it may interrogate the data sources asking for more frequent communication than is normally provided or for more detailed information than is normally provided. Receiver 106 may be in communication with display 208 and computing device 209.

Display 208 presents data in a human understandable form and may provide audible or visual alerts to the user. Display 208 may represent the data or a resulting calculations of the data with visual numbers, letters, symbols, icons, messages, audible messages, recordings, tones, and rings, for example. Display 208 may be a cathode-ray tube (CRT) or liquid crystal (LCD) for example. Display 208 also may show a representation of the fuel usage such as current fuel usage, fuel usage history, recent day fuel usage, recent hour fuel usage, and fuel usage history by time of day, by day of week, or by month, for example. Display 208 may be present inside a residence or other building 107 and positioned in a place within the residence that is easily seen and accessed such as mounted to the wall or placed atop the kitchen counter or hallway table. Display 208 may be a personal computer or the screen of a television set. Display 208 may communicate with receiver 106 and computing device 209, and display 208 may present data directly from receiver 106 or data that was processed by computing device 209.

Computing device 209 may store, analyze, and act on the data presented by receiver 206 and other data. Computing device 209 may be a microcontroller, microcomputer, application specific integrated circuit, or personal computer, for example. Computing device 209 may communicate with display 208, receiver 106, and network for fuel pricing data 211 either directly or indirectly. Computing device 209 may receive all or part of the data available at receiver 106 to generate a history of the data, correlate the data, and predict future data. For example, computing device 209 may generate a history of fuel flow data and predict when fuel container 101 will be empty or reach a threshold level. Computing device 209 may drive display 208, displaying to a user the date on which container 101 is predicted to go empty or reach a threshold level. Computing device 209 also may trigger events such as alerting the user with an e-mail message, simple messaging system text, instant message text, hyper text markup language, an audible tone, or a visual indicator, for example. Computing device 209 also may place a fuel refill order either electronically or by instructing a user to place the order.

Together with display 208, computing device 209 may provide a user interface for system 200. Computing device 209 may direct display 208 to show a set of configurable options or fields for selection or input by a user. The user may enter the selections or other input into computing device 209. The user may do this via a mouse, a keyboard, buttons, or a touch screen display, for example. Computing device 209 may allow the user to select the units that are displayed on display 208. The units may be metric units or imperial units, for example. Computing device 209 may allow the user to select an alert method and to select the events that would trigger the alert. Computing device 209 may allow the user to select a report screen to be displayed by display 208. Each report screen may display the data in a different format such as current fuel usage, fuel usage history, recent day fuel usage, recent hour fuel usage, or fuel usage history by time of day, by day of week, or by month, for example. The report screens may show the data numerically or illustratively, with line graphs, timelines, and bar graphs, for example. Computing device 209 may allow the user the option of selecting a fuel service provider 212 from a list or entering an internet address or universal resource locator.

Computing device 209 also may drive thermostat 210. Thermostat 210 quantifies the room temperature, the interior temperature of building 107, and controls the building's heating system to match a defined temperature. Computing device 209 may adjust thermostat 210 based on any number of parameters, such as current fuel usage, outside temperature, and remaining fuel, for example. User entered configuration information may direct computing device 209 to operate on the data and drive thermostat 210. For example, the user entered configuration information may direct computing device 209 to drive thermostat 210 to maintain a constant amount of fuel consumption over time. Computing device 209 would raise or lower the temperature setting of thermostat 210 based on the fuel flow data.

Thermostat 210 may regularly communicate to computing device 209 its current temperature setting. Computing device 209 may store the settings and the date and time the settings were communicated to establish a thermostat history. Because the user may manually operate the temperature of thermostat 210, the thermostat history may be indicative of the user's temperature preferences over time. Computing device 209 may correlate the thermostat history with exterior temperature or other data. Computing device 209 may drive thermostat 210 on the basis of the thermostat history. For example, if a user consistently sets thermostat 210 to 74 degrees Fahrenheit during 80 degree weather and consistently lowers thermostat 210 during hotter weather, computing device 209 may correlate the outside temperature from environmental sensor 206 with the user's behavior of adjusting thermostat 210.

After acquiring an adequate thermostat history, two weeks for example, computing device 209 may drive thermostat 210 on the basis of the learned pattern. The user may configure parameters that effect computing device 209 and its operations with thermostat 210. The configurable parameters may include selection of basis for driving thermostat 210, length of adequate thermostat history, and the rate at which computing device 209 drives new settings for thermostat 210, for example.

Computing device 209 may correlate data to determine if there is a leak in fuel container 101. By comparing the data from flow sensor 102 with that of fill gauge 205, computing device 209 can determine if fuel has left the tank in a way other than flow sensor 102. Such a discrepancy in the data may indicate that the container has a leak, and computing device 209 may alert the user. The user may be alerted by with an e-mail message, simple messaging system text, instant message text, hyper text markup language, an audible tone, or a visual indicator, for example.

Computing device 209 also may be in communication with a network for fuel pricing data 211. Computing device 209 may receive fuel pricing data from a network for fuel pricing data 211 and may use that data to determine a fuel ordering window in which to order fuel refills. A fuel ordering window may be a range of time. The fuel ordering window may be a day, a week, or 14 days, for example. The fuel ordering window may have a start date and time and an end date and time. Computing device 209 may have bidirectional communication with network for fuel pricing data 211 and may place fuel refill orders electronically with fuel service provider 212 over network for fuel pricing data 211.

Network for fuel pricing data 211 may be a dedicated wireless or wired network or a shared network such as the public Internet. The network for fuel pricing data 211 may make use of an automated meter reading system 213 such as the EnergyAxis® System that uses RF enabled REX™ power meters. Network for fuel pricing data 211 may connect to computing device 209 through communications medium 104, to computing device 209 directly, or through other components not discussed here for brevity and clarity. Network for fuel pricing data 211 may enable communication between fuel service provider 212 and computing device 209. Fuel service provider 212 may send data to computing device 209 such as current fuel pricing and current lead time for order fulfillment, for example. Network for fuel pricing data 211 may enable communication with more than one fuel service provider 212 for the purpose of comparing pricing data. Computing device 209 may send data to fuel service provider 212 such as a fuel refill order, an emergency or severity indicator, fuel status or usage information, and future fuel usage predictions, for example.

In an example embodiment, computing device 209 may use fuel pricing data, lead time for order fulfillment data, and fuel usage data to calculate a fuel ordering window. A fuel ordering window may be a range of time, a day, a week, or 14 days, for example. The window may have a start date and time and an end date and time. The fuel ordering window may reflect a time in which fuel prices are generally low or predicted to be low, such a window is an optimum price fuel ordering window. Alternatively, the fuel ordering window may reflect an emergency need for fuel before the fuel container is empty, such a window is an emergency fuel ordering window. Computing device 209 may alert the user of the fuel ordering window and may request authorization from the user to place an order within the fuel ordering window. Computing device 209 may order a fuel refill by any accepted e-commerce ordering process such as an exchange of HTTP, hypertext transfer protocol, messages with an HTML, hypertext markup language or an XML, extensible markup language, body exchanging the account number and confirmation of the order request, for example. Computing device 209 may allow the user to enter parameters that effect how computing device 209 may predict future fuel usage and may determine fuel ordering windows.

Figure 3:
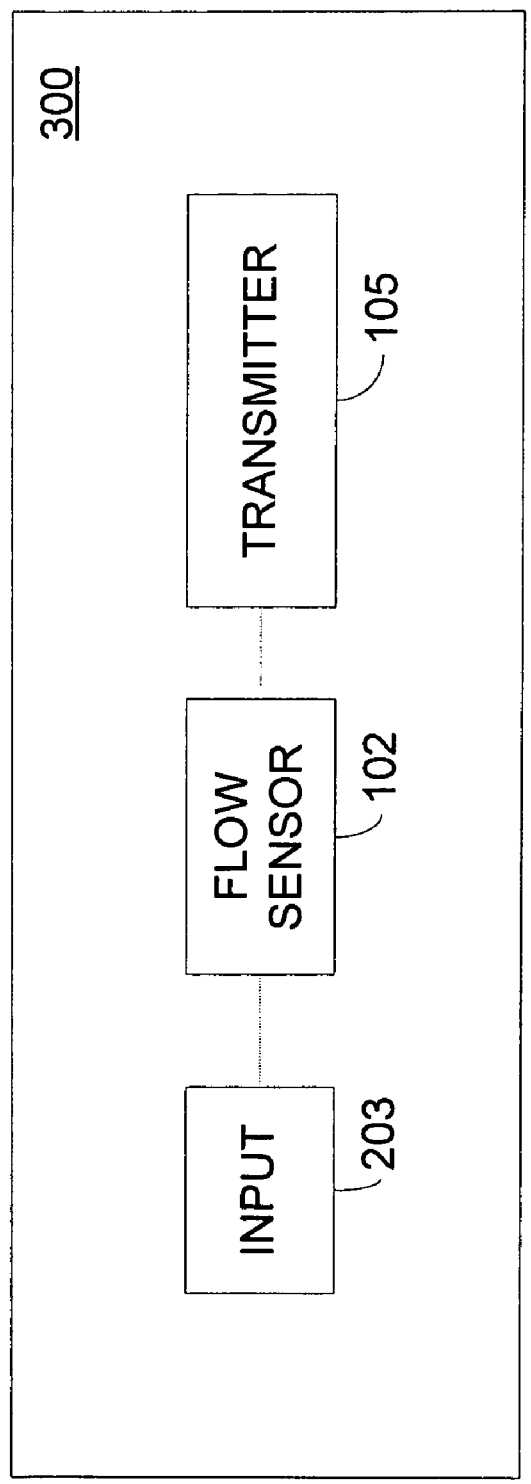
FIG. 3 is a block diagram of an exemplary device for quantifying fuel flow.

FIG. 3 is a block diagram of a device for quantifying fuel flow 300. Input 203 to device 300 may serve to present fuel flow to flow sensor 102. The fuel flow may be presented by input 102 either directly by passing the fuel itself over flow sensor 102 or indirectly by passing the fuel within proximity of flow sensor 102 appropriate for measuring fuel flow. For example, flow sensor 102 that uses a propeller like feature may require that the fuel pass directly over the propeller to measure the flow, but flow sensor 102 that uses ultrasonic technology may not require that the fuel have physical contact with the sensor. Flow sensor 102 takes the fuel flow from input 203 and quantifies the fuel flow into flow data. The flow data may be a volume or mass of fuel divided by a unit of time, gallons per day for example. The flow data from flow sensor 102 may be communicated by transmitter 105.

Figure 4:
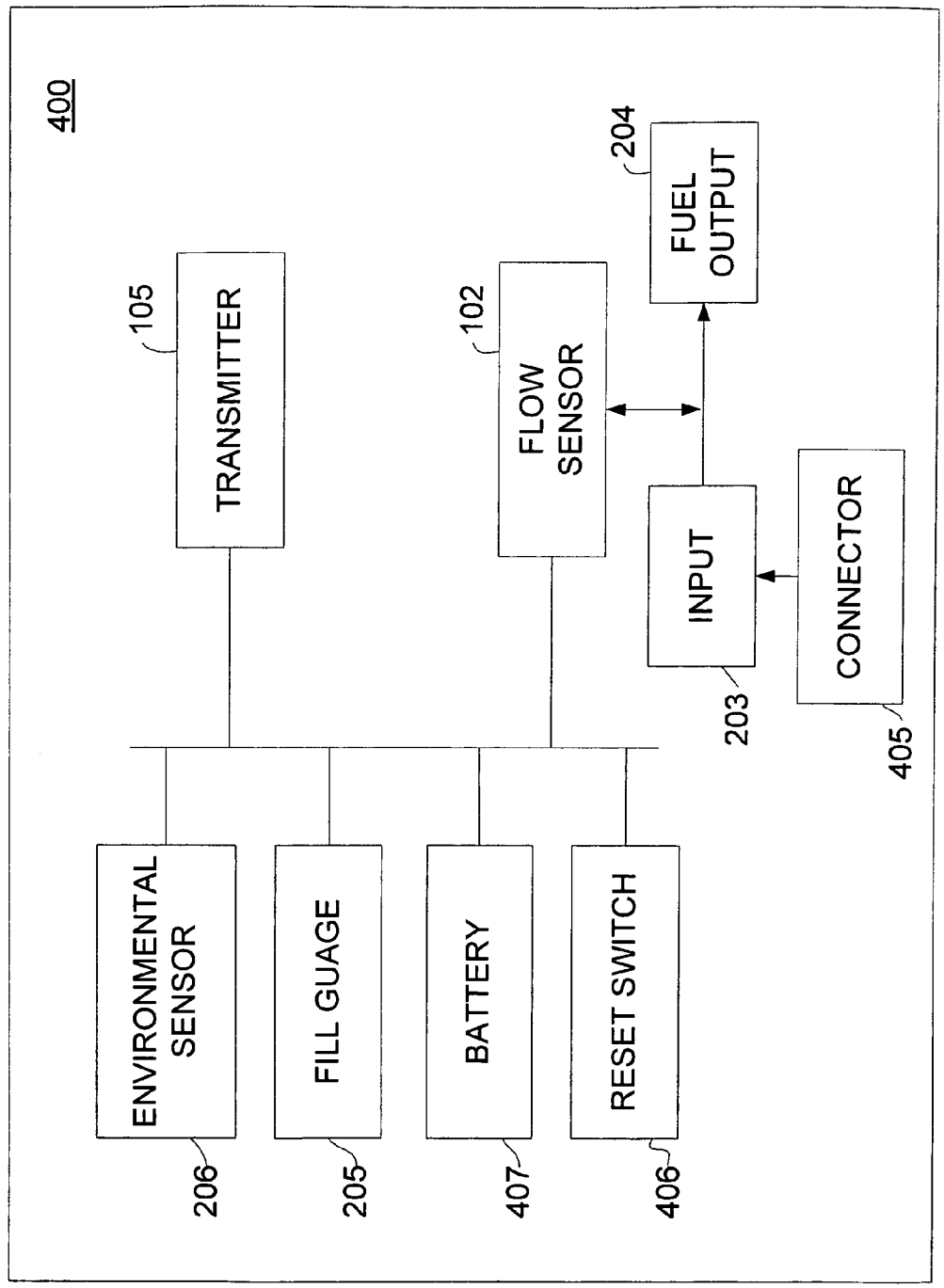
FIG. 4 is a block diagram of an exemplary device for quantifying fuel flow.

FIG. 4 is a block diagram of a device for quantifying fuel flow 400. The device 400 may include fill gauge 205, environmental sensor 206, input 203, flow sensor 102, transmitter 105, a reset switch 406, a battery 407, and a connector 405. Fuel output 204 may receive the fuel flow from input 203 for consumption. Fuel output 204 may be a short outlet with a standard connector or surface for connecting to fuel pipe 103 to a heating system, for example. Connector 405 enables a connection between input 203 and fuel container 101. Connector 405 may be demountable allowing the connection to be attached and removed from fuel container 101.

Reset switch 406 allows a user to indicate to device 400 that container 101 is at a certain level. For example, the fuel service provider or user may engage reset switch 406 immediately after the fuel refill. Typically, as is custom in the field, a refill will put container 101 at 80% of capacity, and engaging reset switch 406 gives an initialization point for the flow data.

Battery 407 may provide electrical energy to device 400. Since the device may be located near fuel container 101 and since fuel container 101 may be located away from the building 107, inconveniently far from fixed electrical power sources, such as a power outlet in the outside wall of a building 107, battery 407 may be used. Battery 407 could use any battery technology, such as lithium ion, gel cell, or lead acid for example, with the appropriate energy and voltage to drive the selected components.

Figure 5:
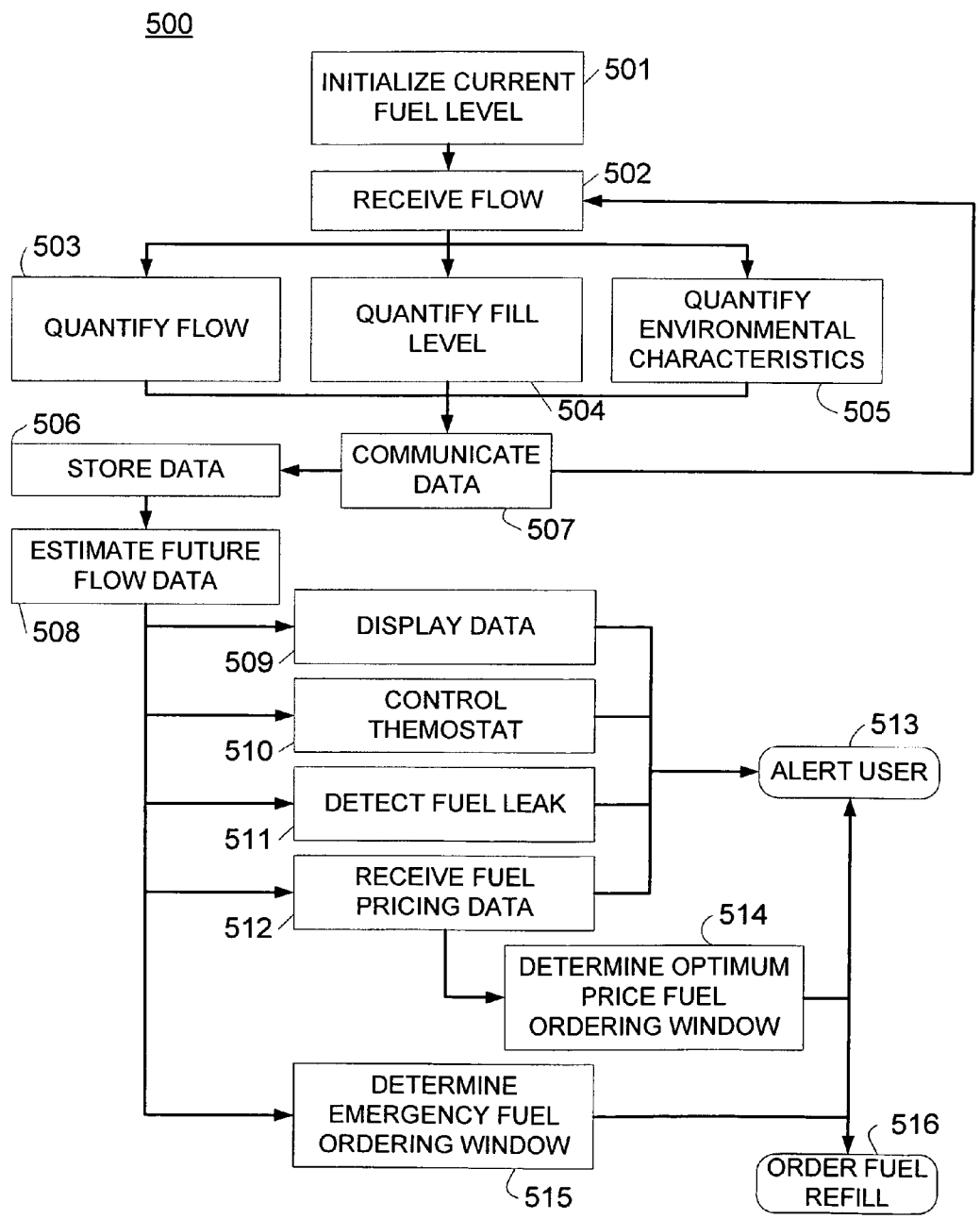
FIG. 5 is a flow chart of an exemplary method for quantifying fuel flow.

FIG. 5 is a flow chart of a method for quantifying fuel flow 500. The current fuel level in the container may be initialized at 501. This may establish a fixed point from which to calculate the future fuel level from the flow data. The fuel flow may be received at 502, by input 203, for example. The fuel flow may be quantified at 503 into flow data. This may be done with flow sensor 102, for example, with input 203 presenting the fuel flow to flow sensor 102.

During quantification, a numerical value may be assessed commensurate with the rate at which the fuel is flowing across some point. Additional data may be acquired, such as quantifying the fill level at 504 into fill data and quantifying environmental characteristics at 505 into environmental data. The resultant data may be communicated at 506 from flow sensor 102 and other sensors present with transmitter 105. The communication may be wireless for example. The data may be stored at 507 to collect a history of data. The data may be stored in a volatile memory such as RAM, random access memory, or processor registers, for example. The data may also be stored in non-volatile memory such as a hard disk, micro-drive, or flash memory, for example. The stored data may be analyzed to estimate future fuel data at 508. For example, future flow data may be extrapolated from a linear average the history data.

In another example, other available data, such as temperature, may be correlated with the flow data, and using standard seasonal weather estimates as a guide, the future flow data may be estimated at 508. Weather estimates such as the number of heating degree days by month and by state available from the United States National Climatic Data Center may be used to help predict future fuel usage. Computing device 209 may calculate the actual heating degree days by subtracting the median temperature for each day from the number 65, for example. Computing device 209 may then correlate the fuel usage history with measured heating degree days to establish an estimated fuel usage level as a function of heating degree days. Computing device 209 may then compute an expected fuel usage from the weather estimate heating degree days.

The stored data and the estimated future data may be employed for displaying the data at 509, controlling thermostat 210 at 510, detecting fuel leaks at 511, determining an emergency fuel ordering window at 515, and, with fuel pricing data, determining an optimum price fuel ordering window at 514. The collective data may be displayed at 509 in a human understandable form. The data displayed may include current flow, current fill, current environmental data, historical flow, historical fill, historical environmental data, estimated future flow data, and fuel pricing data.

Thermostat 210 may be controlled at 510 on the basis of the data. For example, thermostat 210 could be controlled to maintain a defined flow rate. When the flow rate changes, thermostat 210 may be adjusted to compensate. Any number control algorithms known to one skilled in the art may be used. For example a PID (product, integral, derivative) algorithm may be appropriate.

Flow leaks may be detected at 511 by a number of methods. Environmental sensor 206 may be employed to sense for the appropriate fuel in the air outside of the container. If environmental sensor 206 detects a threshold amount of the fuel, environmental sensor 206 may indicate the presence of a leak in container 101. In the alternative, the data from flow sensor 102 and from fill gauge 205 may be compared. That container 101 is losing more fuel as measured by fill gauge 205 than is accounted for by flow sensor 102 may indicate a leak in container 101.

Determining an emergency fuel ordering window at 515 may be done to reduce the risk of having the fuel container go empty. With the estimate of future flow data, it is possible to make an accurate prediction of when container 101 will be empty or reach a threshold minimum such as 10% for example. By knowing the typical time-to-refill, the time between placing a fuel refill order with a fuel service provider and physically completing the fuel refill, it is possible to estimate the last time in which a fuel refill may be ordered that will prevent container 101 from running empty or reaching a threshold minimum. The time-to-refill may be either statically understood by the system as entered by a user, for example, or it may be dynamically updated by e-mail, HTTP, or database queries, for example, over a network with the fuel service provider.

Fuel pricing data may be received at 512 by network for fuel pricing data 211, for example. Network for fuel pricing data 211 may connect fuel service provider 212 as the source of the fuel pricing data. This data may be monitored, stored, and analyzed by computing element 209, for example. On the basis of the data, it is possible to determine an optimum price fuel ordering window at 514. The optimum price fuel ordering window may take into account the volume of the refill, the current price, and the price trend, as well as any other indicators that may be available related to the fuel commodity (e.g., volume and open interest). Any number of analysis tools may be employed to determine the window. The tools may include moving average analysis and oscillator analysis for example, either alone or in combination. Computing device 209 may calculate a moving average and oscillator for daily heating fuel "spot" pricing and maintain a history of these indicators. In addition, a user may have defined pricing rules and entered the rules as input into computing device 209. The rules may be a selection on configurable items or fields presented to the user on display 208.

Computing device 209 may determine the start of an optimum price fuel ordering window on the basis of the indicators and the pre-established rules. For example, computing device 209 may define the start of an optimum price fuel ordering window at the point that the moving average indicates falling prices but the oscillator indicates a positive momentum. In addition, computing device 209 may take current fuel level into consideration when determining the optimum price fuel ordering window. For example, if the container is relatively full, computing device 209 may require that the current pricing be below a pre-defined level and that there be an indication that prices are likely to rise before declaring an optimum price fuel ordering window. For example, if the container is relatively empty, computing device 209 may require only that the prices are rising to are likely to rise before declaring an optimum price fuel ordering window.

The user may be alerted at 513. The alert may take the form of an e-mail message, simple messaging system text, instant message text, hyper text markup language, an audible tone, or a visual indicator, for example. The alert may be configured to occur regularly such as a daily status e-mail. The alert may be configured to occur upon established triggers such as the positive determination of a fuel leak, the commencement of an optimum price fuel ordering window, the commencement of an emergency fuel ordering window, or the ordering a fuel refill at 516 for example.

Ordering a fuel refill at 516 can occur at any time. The fuel refill may be ordered by a user either independently or as prompted by an alert. The fuel refill may be ordered automatically or upon instruction by computing device 209. Computing device 209 may employ network for fuel pricing data 211 or other network to communicate the order to fuel service provider 212. Computing device 209 may order the refill subject to configuration information entered by the user, such as maximum allowable price or minimum required fill volume. Generally, computing device 209 may place an order for refill at the commencement of a optimum price fuel ordering window; otherwise, computing device 209 may order a refill at the commencement of the emergency fuel ordering window to avoid the container from going empty or reaching a threshold minimum. The mechanism supporting the ordering at 516 may be any accepted e-commerce ordering process such as an exchange of HTTP, hypertext transfer protocol, messages with HTML, hypertext markup language or XML, extensible markup language, body exchanging the account number and confirmation of the order request, for example.

It is to be understood that the foregoing illustrative embodiments have been provided merely for the purpose of explanation and are in no way to be construed as limiting. Words used herein are words of description and illustration, rather than words of limitation. In addition, the advantages and objectives described herein may not be realized by each and every embodiment. Further, although the description herein references particular structure, interconnections and/or embodiments, the references are intended to represent example structure, interconnections, and/or embodiments rather than prescribe the particulars disclosed herein. The scope intended extends to all functionally equivalent structures, methods and uses, such as are within the scope of the appended claims.

For example, although a great deal of the discussion was based on the use of certain devices and communication paths, it should be appreciated that the contemplated embodiments include the use of any devices, communication paths and techniques. Moreover, although device configurations have been described herein, it should be appreciated that the devices are provided merely to provide an understanding of the many techniques contemplated by the embodiments. Those skilled in the art, having the benefit of the teachings of this specification, may affect numerous modifications thereto and changes may be made without departing from the scope and spirit of the of the appended claims.

What is claimed is:

1. A system for quantifying fuel flow from a substantially stationary consumer container, comprising:
   a computing device;
   a flow sensor;
   a fill gauge in direct connection with said flow sensor, the fill gauge in communication with the computing device through the direct connection with said flow sensor;
   a communications medium in communication with said flow sensor;
   a receiver in communication with said communication medium; and
   a display in communication with said receiver,
   the computing device in communication with said display, said computing device capable of calculating a fuel ordering window, said fuel ordering window including a staff date, staff time, end date and end time, and said computing device further capable of ordering a fuel refill, said fuel refill requiring an authorization by a user.

2. The system of claim 1, wherein said communications medium is wireless.

3. The system of claim 1, further comprising an environmental sensor in communication with said communications medium.

4. The system of claim 1, wherein said fill gauge is in communication with said communications medium.

5. The system of claim 1, wherein said flow sensor is demountably attached to a fuel container.

6. The system of claim 1, wherein said computing device predicts future fuel usage.

7. The system of claim 6, wherein said communications medium is wireless.

8. The system of claim 7, further comprising an environmental sensor in communication with said communications medium.

9. The system of claim 1, further comprising a network for fuel pricing data in communication with said communications medium, wherein said network is in communication with a fuel service provider.

10. The system of claim 1, wherein said computing device alerts said user of said fuel ordering window.

11. The system of claim 1, wherein said computing device alerts said user by at least one of the following: an e-mail message, simple messaging system text, instant message text, or hyper text markup language, an audible tone, or a visual indicator.

12. The system of claim 1, further comprising a thermostat for quantifying room temperature and controlling a heating system, wherein said thermostat is in communication with said computing device.

13. The system of claim 12, wherein a user entered configuration directs said computing device to control said thermostat.

14. The system of claim 1, wherein said fill gauge is in communication with said communications medium, wherein said computing device detects tank leakage and alerts a user.

15. The system of claim 1, wherein said communications medium is part of an automated meter reading system.

16. The system of claim 1, wherein said display is inside a residence.

17. The system of claim 1, wherein said computing device is a personal computer.

18. The system of claim 9, wherein said network for fuel pricing data uses Internet connectivity.

19. The system of claim 1, wherein said display shows a representation of fuel usage history.

20. The system of claim 1, wherein said display shows a representation of fuel usage by time of day.

21. A device for quantifying fuel flow from a substantially stationary consumer container, comprising:
   a computing device;
   a flow sensor for quantifying flow into data;
   a fill gauge in direct connection with said flow sensor, the fill gauge in communication with the computing device through the direct connection with said flow sensor;
   an input for presenting flow at said flow sensor;
   a transmitter in communication with said flow sensor for communicating said data; and
   q receiver in communication with said transmitter,
   the computing device in communication with said receiver, said computing device capable of calculating a fuel ordering window, said fuel ordering window including a start date, start time, end date and end time, and said computing device further capable of ordering a fuel refill, said fuel refill requiring an authorization by a user.

22. The device of claim 21, further comprising a fuel output for receiving flow from said input.

23. The device of claim 21, wherein said transmitter is a spread spectrum radio.

24. The device of claim 21, further comprising a connector for demountably securing said input to a fuel container.

25. The device of claim 21, further comprising a reset switch for indicating a fuel level.

26. The device of claim 21, further comprising a battery for providing electrical energy. pg,18

27. The device of claim 21, further comprising an environmental sensor in communication with said transmitter.

28. The device of claim 27, wherein said environmental sensor quantifies at least on the of the following: temperature, wind speed, humidity, and atmospheric pressure.

29. The device of claim 27, wherein said environmental sensor detects propane gas.

* * * * *

UNITED STATES PATENT AND TRADEMARK OFFICE
CERTIFICATE OF CORRECTION

PATENT NO.         : 7,533,703 B2                                      Page 1 of 1
APPLICATION NO. : 11/205803
DATED              : May 19, 2009
INVENTOR(S)        : Kenneth C. Shuey It is certified that error appears in the above-identified patent and that said Letters Patent is hereby corrected as shown below:

At COL. 9, line 67 (claim 1), delete both occurrences of "staff" and substitute therefor --start--

At COL. 10, line 63, delete "q" an substitute therefor --a--

At COL. 12, line 2, after "energy." delete "pg,18"

At COL. 12, line 6, delete "on" and substitute therefor --one--

Signed and Sealed this

Seventh Day of July, 2009

JOHN DOLL
*Acting Director of the United States Patent and Trademark Office*